No. 864,744. PATENTED AUG. 27, 1907.
J. W. POWELL.
LEVEL.
APPLICATION FILED MAY 29, 1906. RENEWED JULY 3, 1907.

Witnesses
M. C. Lyddane
A. F. Gill

Inventor
James W. Powell
By W. J. FitzGerald
Attorneys

UNITED STATES PATENT OFFICE.

JAMES W. POWELL, OF CLEONE, OREGON.

LEVEL.

No. 864,744.      Specification of Letters Patent.      Patented Aug. 27, 1907.

Application filed May 29, 1906, Serial No. 319,366. Renewed July 3, 1907. Serial No. 382,077.

*To all whom it may concern:*

Be it known that I, JAMES W. POWELL, a citizen of the United States, residing at Cleone, in the county of Multnomah and State of Oregon, have invented certain new and useful Improvements in Leveling Instruments; and I do hereby declare the following to be a full, clear, and exact description of the invention, such as will enable others skilled in the art to which it appertains to make and use the same.

My invention relates to new and useful improvements in leveling instruments and more particularly to that class known as spirit levels and my object is to provide an instrument of this class whereby any angle can be ascertained up to ninety degrees.

A further object is to provide means for holding the parts of my improved device after they have been adjusted.

A further object is to so construct the parts of my device that one portion thereof will fold over the tube containing the leveling fluid which will be protected when the instrument is thus folded together.

Other objects and advantages will be hereinafter made clearly apparent in the specification and pointed out in the claims.

In the accompanying drawings, which are made a part of this application, I have shown the preferred form of my invention.

Figure 1:
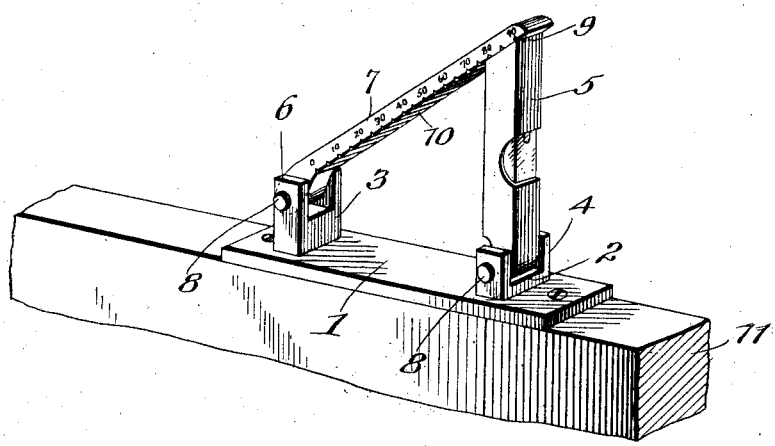
Figure 2:
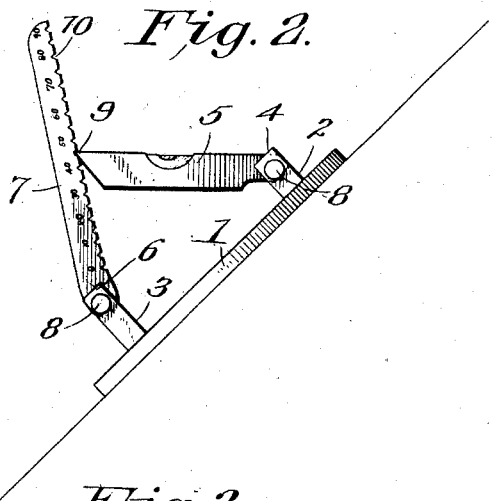
Figure 4:
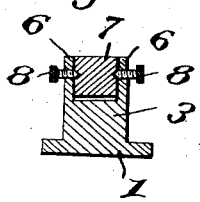
Figure 3:
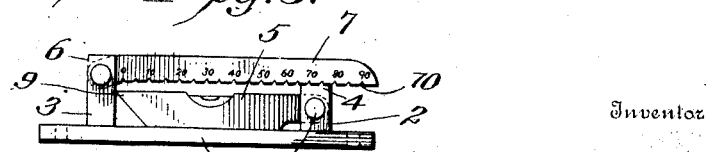

In said drawings—Figure 1 is a perspective view of my improved leveling instrument showing the same secured to a straight edge; Fig. 2 is an elevation of the same, the instrument being set to ascertain the angle of forty five degrees; Fig. 3 is an elevation showing the instrument folded together and ready for transportation, and Fig. 4 is a sectional view through one of the standards.

Referring to the figures by numerals of reference, 1 indicates the base of my improved instrument to the upper surface of which are secured standards 2 and 3, the standard 2 being provided with ears 4 between which is pivotally secured a leveling bulb 5 and the standard 3 is provided with similar ears 6 between which is pivotally mounted a graduated arm 7. The leveling bulb 5 and the arm 7 are held in place between the ears 4 and 6 respectively by means of adjusting bolts 8, said bolts being so arranged that after the parts have been properly adjusted, they may be held in their adjusted position by directing the points of the bolts 8 tightly against the ends of the bulb 5 and arm 7, the inner ends of the bolts 8 serving as pivots for the bulb and arm. The upper end 9 of the leveling bulb 5 is disposed at an angle so that when said end is brought into engagement with the arm 7, the notches 10 in the arm will be engaged by the extreme upper edge of the leveling bulb, thereby enabling me to make an accurate adjustment between the two parts.

As shown in Fig. 1 of the drawings, my improved instrument may be secured to a straight edge or the like 11 when being used on large work. When the instrument is not secured to a straight edge it is intended to be of such size as to be conveniently carried in the pocket and can be used for leveling horizontal surfaces as well as surfaces disposed at an angle.

To ascertain the pitch of any angle between zero and ninety degrees or to get the surface at a predetermined angle, the instrument is employed as in Fig. 2 of the drawings, the base 1 being disposed on the surface and the leveling bulb elevated along the arm 7 until the bead in said leveling bulb has reached a point showing that the bulb is horizontal and by bringing the arm 7 into contact with the end 9, it will indicate the degree of pitch of the surface upon which the instrument is resting.

The standard 3 is preferably made longer than the standard 2 so that when the leveling bulb is disposed in a horizontal position or resting upon the base 1, the arm 7 will descend directly over the leveling bulb and rest upon the post 2, thereby forming a shield for the leveling bulb and protect the same against breakage as well as disposing the parts of the instrument into a compact form and admitting of its ready insertion into the user's pocket.

What I claim as new is:—

1. An instrument of the class described comprising a base, a standard secured to said base and near one end thereof, ears on said standard, a graduated arm pivotally mounted between said ears, an adjusting bolt through said ears, a standard at the opposite end of said base of less length than the first mentioned standard, ears on said standard, a leveling device pivotally secured between said ears, and an adjusting bolt through said ears and leveling device, the upper end of said leveling device being tapered, the extreme end thereof being adapted to engage graduations on the arm to determine the pitch of a surface.

2. An instrument of the class described comprising a base, standards on said base, one of said standards being of greater length than the other, a leveling device secured to one of said standards, means to hold said leveling device in its adjusted position, an arm having graduations thereon pivoted to the opposite standard, and means to hold said arm in its adjusted position.

3. An instrument of the class described comprising the combination with a base, standards on said base and a leveling instrument pivotally secured to one of said standards and having its free end tapered to form a sharp edge; of a graduated arm pivotally secured to the opposite standard and having notches to engage the sharpened edge of said leveling instrument.

In testimony whereof I have signed my name to this specification in the presence of two subscribing witnesses.

JAMES W. POWELL.

Witnesses:
BAZEL BLUM,
T. E. PETERSON.